US010875947B2

(12) United States Patent
Patel et al.

(10) Patent No.: US 10,875,947 B2
(45) Date of Patent: Dec. 29, 2020

(54) ETHYLENIC POLYMER AND ITS USE

(71) Applicant: Dow Global Technologies LLC, Midland, MI (US)

(72) Inventors: Rajen M. Patel, Lake Jackson, TX (US); Robert N. Cotton, Missouri City, TX (US); Sharon Baker, Lake Jackson, TX (US); Pradeep Jain, Lake Jackson, TX (US); Jian Wang, Rosharon, TX (US); Jeffrey A. Sims, Lake Jackson, TX (US); Tianzi Huang, Lake Jackson, TX (US); Matthew Lehr, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 63 days.

(21) Appl. No.: 15/903,358

(22) Filed: Feb. 23, 2018

(65) Prior Publication Data

US 2018/0179311 A1    Jun. 28, 2018

Related U.S. Application Data

(63) Continuation of application No. 13/376,047, filed as application No. PCT/US2010/040759 on Jul. 1, 2010, now abandoned.

(Continued)

(51) Int. Cl.
*C08F 210/16* (2006.01)
*B32B 27/06* (2006.01)
(Continued)

(52) U.S. Cl.
CPC ............ *C08F 210/16* (2013.01); *B32B 5/022* (2013.01); *B32B 5/024* (2013.01); *B32B 5/08* (2013.01);
(Continued)

(58) Field of Classification Search
CPC .... C08F 210/16; C08F 10/00; C08F 4/65908; C08F 4/65912; B32B 5/022; B32B 5/024;
(Continued)

(56) References Cited

U.S. PATENT DOCUMENTS 3,284,421 A    11/1966    Breslow et al.
3,297,674 A    1/1967    Breslow et al.
(Continued)

FOREIGN PATENT DOCUMENTS

EP       1177225 B1       1/2009
WO     1993008221 A3     8/1993
(Continued)

OTHER PUBLICATIONS

Balke, Chromatography Polym., Chapter 13, 1992.
(Continued)

*Primary Examiner* — Josephine L Chang
(74) *Attorney, Agent, or Firm* — Quarles & Brady LLP

(57) ABSTRACT

New ethylene polymers having low levels of long chain branching are disclosed. Films and film layers made form these polymers have good hot tack strength over a wide range of temperatures, making them good materials for packaging applications.

8 Claims, 1 Drawing Sheet

Related U.S. Application Data

(60) Provisional application No. 61/222,367, filed on Jul. 1, 2009.

(51) Int. Cl.
| | | |
|---|---|---|
| *B32B 27/32* | (2006.01) | |
| *C08F 10/00* | (2006.01) | |
| *C08J 5/18* | (2006.01) | |
| *C08L 23/08* | (2006.01) | |
| *B32B 25/06* | (2006.01) | |
| *B32B 27/18* | (2006.01) | |
| *B32B 27/20* | (2006.01) | |
| *B32B 27/22* | (2006.01) | |
| *B32B 27/30* | (2006.01) | |
| *B32B 5/02* | (2006.01) | |
| *B32B 5/08* | (2006.01) | |
| *B32B 5/24* | (2006.01) | |
| *C08F 4/659* | (2006.01) | |
| *C08L 53/02* | (2006.01) | |

(52) U.S. Cl.
CPC ............ *B32B 5/24* (2013.01); *B32B 25/06* (2013.01); *B32B 27/06* (2013.01); *B32B 27/18* (2013.01); *B32B 27/20* (2013.01); *B32B 27/22* (2013.01); *B32B 27/302* (2013.01); *B32B 27/306* (2013.01); *B32B 27/308* (2013.01); *B32B 27/32* (2013.01); *B32B 27/327* (2013.01); *C08F 10/00* (2013.01); *C08J 5/18* (2013.01); *C08L 23/0815* (2013.01); *B32B 2262/023* (2013.01); *B32B 2262/0207* (2013.01); *B32B 2262/0253* (2013.01); *B32B 2262/12* (2013.01); *B32B 2270/00* (2013.01); *B32B 2307/30* (2013.01); *B32B 2307/31* (2013.01); *B32B 2307/50* (2013.01); *B32B 2307/714* (2013.01); *B32B 2307/72* (2013.01); *B32B 2405/00* (2013.01); *B32B 2437/02* (2013.01); *B32B 2471/00* (2013.01); *B32B 2553/00* (2013.01); *B32B 2555/02* (2013.01); *B32B 2581/00* (2013.01); *B32B 2597/00* (2013.01); *B32B 2605/00* (2013.01); *B32B 2605/003* (2013.01); *C08F 4/65908* (2013.01); *C08F 4/65912* (2013.01); *C08J 2323/08* (2013.01); *C08L 53/02* (2013.01); *C08L 2312/00* (2013.01); *C08L 2666/24* (2013.01)

(58) Field of Classification Search
CPC ........... B32B 5/08; B32B 25/06; B32B 27/06; B32B 27/18; B32B 27/20; B32B 27/22; B32B 27/302; B32B 27/306; B32B 27/208; B32B 27/32; B32B 27/327; B32B 2262/0207; B32B 2262/023; B32B 2262/0253; B32B 2262/12; B32B 2270/00; B32B 2307/30; B32B 2307/31; B32B 2307/50; B32B 2307/714; B32B 2307/72; B32B 2405/00; B32B 2437/02; B32B 2471/00; B32B 2553/00; B32B 2555/00; B32B 2581/00; B32B 2597/00; B32B 2305/00; B32B 2605/003; C08J 5/18; C08J 2323/08; C08L 23/0815; C08L 53/02; C08L 2312/00; C08L 2666/24
USPC ...................................................... 524/579
See application file for complete search history.

(56) References Cited

U.S. PATENT DOCUMENTS

| | | |
|---|---|---|
| 3,485,706 A | 12/1969 | Du Pont |
| 4,322,027 A | 3/1982 | Reba |
| 4,340,563 A | 7/1982 | Appel et al. |
| 4,413,110 A | 11/1983 | Kavesh et al. |
| 4,544,762 A | 10/1985 | Kaminsky et al. |
| 4,663,220 A | 5/1987 | Wisneski et al. |
| 4,668,566 A | 5/1987 | Braun |
| 5,015,749 A | 5/1991 | Schmidt et al. |
| 5,041,584 A | 8/1991 | Crapo et al. |
| 5,041,585 A | 8/1991 | Deavenport et al. |
| 5,266,627 A | 11/1993 | Meverden et al. |
| 5,272,236 A | 12/1993 | Lai et al. |
| 5,278,272 A | 1/1994 | Lai et al. |
| 5,542,199 A | 8/1996 | Dreisbach et al. |
| 5,844,045 A | 12/1998 | Kolthammer et al. |
| 5,869,575 A | 2/1999 | Kolthammer et al. |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,566,446 B1 | 5/2003 | Parikh et al. |
| 6,797,779 B1 | 9/2004 | Ajbani et al. |
| 6,919,414 B2 | 7/2005 | Chai et al. |
| 7,355,089 B2 | 4/2008 | Chang et al. |
| 2004/0010103 A1 | 1/2004 | Boussie et al. |
| 2007/0100132 A1† | 5/2007 | Neubauer |
| 2009/0299116 A1 | 12/2009 | Konze et al. |
| 2010/0160497 A1 | 6/2010 | Karjala et al. |

FOREIGN PATENT DOCUMENTS

| | | |
|---|---|---|
| WO | 2005/021622 A2 | 3/2005 |
| WO | 2005/090427 † | 9/2005 |
| WO | 2006101999 A8 | 10/2007 |
| WO | 2007/136496 † | 11/2007 |
| WO | 2007136496 A2 | 11/2007 |
| WO | 2007136497 A2 | 11/2007 |

OTHER PUBLICATIONS

Kratochvil, Classical Light Scattering from Polymer Solutions, 1987, Elsevier, Oxford, NY.
Mourey, Chromatography Polym., Chapter 12, 1992.
Park, "Polyolefin Foam", Handbook of Polymer Foams and Technology, Hanser Publishers, 1991, Chap. 9, p. 198-204, Munich.
Randall, Rev. Macromol. Chem. Phys., C29, V. 2&3, 285-297.
Rudin, Modern Methods of Polymer Characterization, 1991 103-112, John Wiley & Sons, New York.
Zimm, J. Chem. Phys., 1948, 16, 1099.
Zimm, J. Chem. Phys., 1949, 17, 1301.
International Search Report for related International Appln. No. PCT/US2010/040759 dated Nov. 25, 2010, 5 pages.
International Preliminary Report for related International Appln. No. PCT/US2010/040759 dated Jan. 12, 2012, 8 pages.
Written Opinion for related International Appln. No. PCT/US2010/040759 dated Nov. 25, 2010, 5 pages.
Karjala et al., "Detection of Low Levels of Long-Chain Branching in Polyolefins", ANTEC, 2008, pp. 887-891.†
Garcia-Franco et al., "Relative quantification of long chain branching in essentially linear polyethylenes", European Polymer Journal, 44 (2008) pp. 376-391.†
Cotts et al., "Novel Branching Topology in Polyethylenes as Revealed by Light Scattering and 13C NMR", Macromolecules, (2000), pp. 6945-6952.†
DeGaravilla, "Ionomer, acid copolymer, and metallocene polyethylene resins: A comparative assessment of sealant performance", TAPPI Journal, vol. 78, No. 6, (1995), pp. 191-203.†

† cited by third party

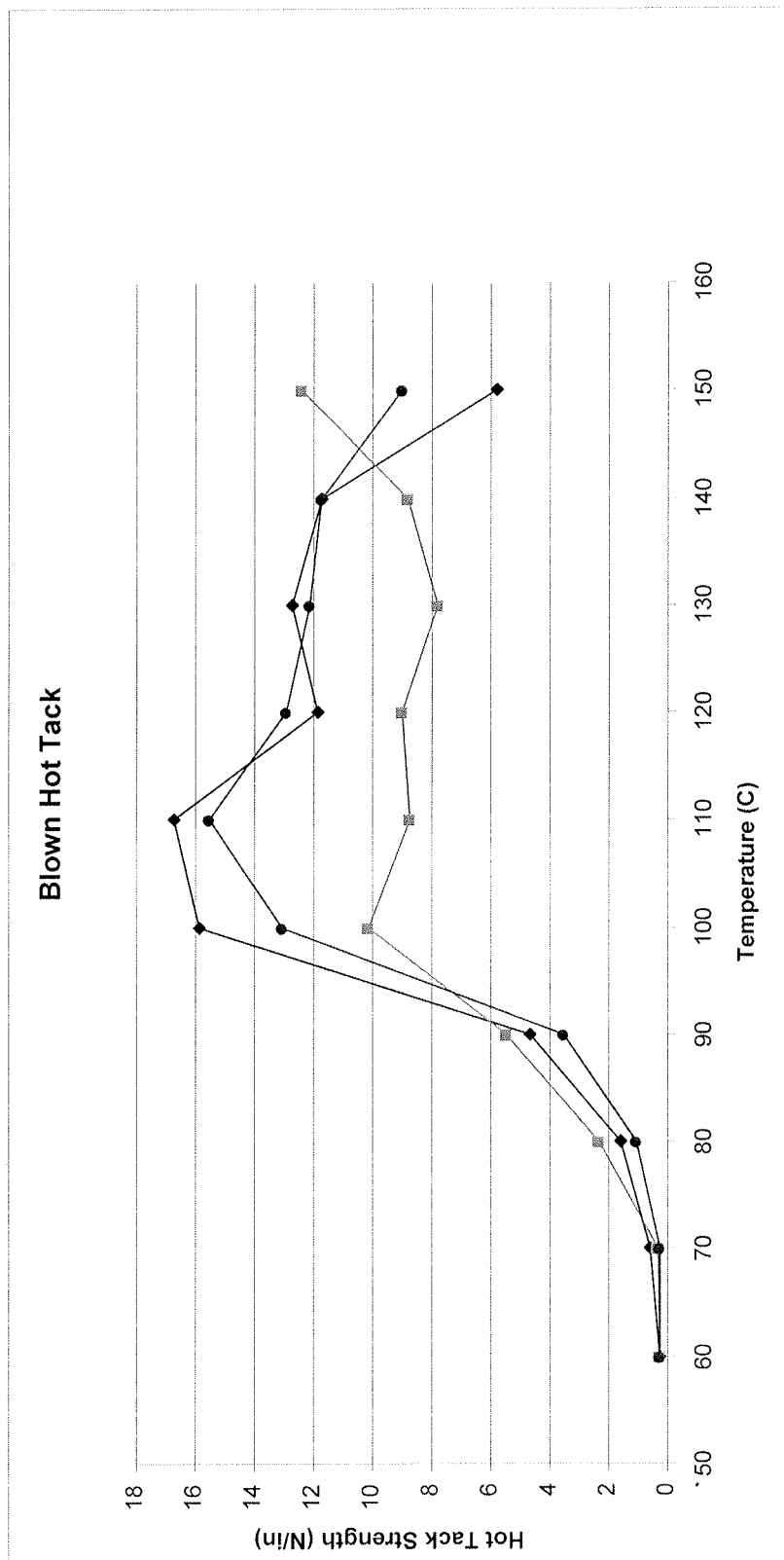

ETHYLENIC POLYMER AND ITS USE

CROSS-REFERENCE TO RELATED APPLICATIONS

The present application is a continuation of U.S. application Ser. No. 13/376,047 filed on Dec. 2, 2011 which is a U.S. 371 National Phase filing of PCT application Serial No. PCT/US2010/040759 filed on Jul. 1, 2010, which claims the benefit of U.S. Provisional Application No. 61/222,367, filed on Jul. 1, 2009 all of which are fully incorporated herein.

BACKGROUND OF THE INVENTION

Metallocene-catalyzed polymers have been commercial for several years, and are used in many end-use applications, such as packaging, personal hygiene, automotive, flooring, adhesives, fibers, nonwovens, films, sheets, and fabrics. The metallocene-catalyzed polymers have certain advantages, such as narrow molecular weight distributions. Some of the metallocene-catalyzed polymers are homogeneous polymers that have long chain branching which enhances their processability. However, metallocene-catalyzed polymers are still subject to degradation under ultraviolet light and have cross-linking characteristics that make their use in certain applications more challenging. Further, those metallocene-catalyzed polymers which have relatively high levels of long chain branching typically exhibit poor hot tack strength and/or a narrow sealing window, which renders them less useful in certain film applications.

Known metallocene-catalyzed polymers include both (a) the homogeneous-branched, substantially linear ethylene polymers ("SLEP") which are prepared using constrained geometry catalysts ("CGC Catalyst"), such as disclosed in U.S. Pat. Nos. 5,272,236 and 5,278,272, and WO93/08221, as well as the homogeneous linear ethylene polymers ("LEP") which are prepared using other metallocene (called "bis-CP catalysts"). Various grades of SLEPs, having a variety of densities and melt flow rates, are commercially available from The Dow Chemical Company as ENGAGE™ polyolefin elastomers or AFFINITY™ plastomers. Various grades of LEPs are commercially available from ExxonMobil Chemical Company as EXACT™ or EXCEED™ polymers.

A characteristic of metallocene-catalyzed polymers is that they have a significant level (typically in excess of 300 wppm) of residual unsaturation, with that unsaturation being in various combinations and amounts of one or more of the following unsaturated groups:

Vinyl, vinylidene, vinylene, vinyl-3, and tri-substituted vinyls.

Such residual unsaturations, and particularly the vinyl-3 groups, are believed to contribute to long-term polymer degradation, as well as to difficulties in controlling either or both of desired cross-linking in some applications or undesired cross-linking (such as the formation of gels) in other end-use applications (such as films).

Further, for film applications, it is desirable to have a broad thermal bonding window (temperature range) as well as relatively low hot tack initiation temperature.

BRIEF SUMMARY OF THE INVENTION

This invention is related to new essentially linear polyethylene resins having a very low level of long chain branching. Such resins have $I_{10}/I_2$ (measured at 190° C.) from about 5.8 to about 6.5, preferably from about 5.9 to about 6.5; a zero shear viscosity (ZSV) ratio of from about 1.3 to about 2.3, preferably from about 1.4 to about 2.2, most preferably from about 1.5 to about 2.1 and Mw/Mn of from about 2.0 to about 2.4, preferably from about 2.1 to about 2.3. Such resins can have melt index (190° C., 2.16 kg load) from about 0.5 to about 15 grams/10 minutes, preferably from about 0.7 to about 12. Such resins can also have a DSC melting point defined by the relationship:

$Tm$ (° C.)$\leq(-7914.1*(density)2)+(15301*density)-7262.4$, where density is in g/cc. The density of the polymers can be from about 0.857 g/cc to 0.905 g/cc, preferably from about 0.865 g/cc to 0.905 g/cc, most preferably from about 0.885 g/cc to 0.905 g/cc.

In one aspect of the invention, there is provided an ethylenic polymer having an overall polymer density of not more than 0.905 g/cm3; a GI200 gel rating of not more than 15; I10/I2 (measured at 190° C.) from about 5.8 to about 6.5, preferably from about 5.9 to about 6.5; a zero shear viscosity (ZSV) ratio of from about 1.3 to about 2.3, preferably from about 1.4 to about 2.2, most preferably from about 1.5 to about 2.1; and Mw/Mn of from about 2.0 to about 2.4, preferably from about 2.1 to about 2.3; and/or a g' (HMW)/g' (LMW) of greater tan 0.95.

BRIEF DESCRIPTION OF THE DRAWINGS

FIG. 1 shows hot tack data for two ethylenic polymers of the invention made into film layers and for a comparative example, wherein the diamonds correspond to Inventive Example 1, the circles correspond to Inventive Example 2, and the squares correspond to Comparative Example A.

DETAILED DESCRIPTION OF THE INVENTION

Definitions

"Composition," as used, includes a mixture of materials which comprise the composition, as well as reaction products and decomposition products formed from the materials of the composition.

"Blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

"Linear," as used, refers to polymers where the polymer backbone of the polymer lacks measurable or demonstrable long chain branches, for example, the polymer is substituted with an average of less than 0.01 long branch per 1000 carbons.

"Polymer" refers to a polymeric composition prepared by polymerizing monomers, whether of the same or a different type. The generic term "polymer" thus embraces the term "homopolymer," usually employed to refer to polymers prepared from only one type of monomer, and the term "interpolymer" as defined. The terms "ethylene/α-olefin polymer" is indicative of interpolymers as described.

"Interpolymer," as used, refers to polymers prepared by the polymerization of at least two different types of monomers. The generic term interpolymer includes copolymers (usually employed to refer to polymers prepared from two different monomers) and polymers prepared from more than two different types of monomers.

"Ethylenic polymer" refers to a polymer that contains more than 50 mole percent polymerized ethylene monomer (based on the total amount of polymerizable monomers) and, optionally, may contain one or more comonomers.

The term "ethylene/α-olefin interpolymer" refers to an interpolymer that contains more than 50 mole percent polymerized ethylene monomer (based on the total amount of polymerizable monomers) and at least one α-olefin.

Test Methods and Measurements

Density:

The density of a polymer (g/cm$^3$) is measured according to ASTM-D 792-03, Method B, in isopropanol. Specimens are measured within 1 hour of molding after conditioning in the isopropanol bath at 23° C. for 8 min to achieve thermal equilibrium prior to measurement. The specimens are compression molded according to ASTM D-4703-00 Annex A with a 5 min initial heating period at about 190° C. and a 15° C./min cooling rate per Procedure C. The specimen is cooled to 45° C. in the press with continued cooling until "cool to the touch."

Melt Indices and Melt Index Ratio:

The melt index ($I_2$) of a polymer is measured in accordance with ASTM D 1238, Condition 190° C./2.16 kg, and is reported in grams eluted per 10 minutes, and the melt index ($I_{10}$) is measured in accordance with ASTM D 1238, Condition 190° C./10 kg, and is reported in grams eluted per 10 minutes. The melt index ratio ($I_{10}/I_2$) is a ratio of these two melt indices.

Differential Scanning Calorimetry:

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties. The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (Tm), peak crystallization temperature (Ta), heat of fusion ($H_f$) (in Joules per gram), and the calculated % crystallinity for polyethylene samples using:

$$\% \text{ Crystallinity} = ((H_f)/(292 \text{ J/g})) \times 100.$$

The heat of fusion ($H_f$) and the peak melting temperature are reported from the second heat curve. Peak crystallization temperature is determined from the cooling curve.

Molecular Weight Measurements by Triple Detector Gel Permeation Chromatography (3D-GPC)

The 3D-GPC system consists of a Polymer Laboratories (Shropshire, UK) Model 210 equipped with an on-board differential refractometer (RI). Additional detectors can include Precision Detectors (Amherst, Mass.) 2-angle laser light scattering detector Model 2040, and a Viscotek (Houston, Tex.) 150R 4-capillary solution viscometer. The 15-degree angle of the light scattering detector is used for calculation purposes. Data collection can be performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns such as 30 cm Polymer Labs columns of 10-micron mixed-pore-size packing (Mixed-B). The sample carousel compartment is operated at 145° C. and the column compartment is operated at 145° C. The samples are prepared at a concentration of 0.025 g of polymer in 20 mL of solvent. The chromatographic solvent contains 100 ppm and the sample preparation solvent contains 200 ppm of butylated hydroxytoluene (BHT). Both solvents are sparged with nitrogen. The polyethylene samples are gently shaken every 30 minutes while maintaining 160° C. for 2.5~3.0 hours. The injection volume is 200 microliters. The flow rate through the GPC is set at 1 mL/minute.

The GPC column set is calibrated before running the polymer by running twenty narrow molecular weight distribution polystyrene standards. The molecular weight (MW) of the standards ranges from 580 to 8,400,000 g/mol, and the standards are contained in 6 "cocktail" mixtures. Each standard mixture has at least a decade of separation between individual molecular weights. The standards are purchased from Polymer Laboratories (Shropshire, UK). The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards were dissolved at room temperature with gentle agitation for four hours. The narrow standards mixtures are run first and in order of decreasing highest molecular weight component to minimize degradation. A logarithmic molecular weight calibration is generated using a fifth-order polynomial fit as a function of elution volume. The absolute molecular weights were obtained in a manner consistent with that published by Zimm (Zimm, B. H., J. Chem. Phys., 16, 1099 (1948)) and Kratochvil (Kratochvil, P., Classical Light Scattering from Polymer Solutions, Page 113-136, Elsevier, Oxford, N.Y. (1987)). The response factor of the laser detector and the viscometer were determined using the certificated value for the weight average molecular weight (52,000 g/mol, dn/dc=0.104 mL/g) and intrinsic viscosity (1.01 dL/g) of NIST 1475. The mass constant of the differential refractive index detector was determined using the area under the curve, concentration, and injection volume of the broad polyethylene homopolymer. The chromatographic concentrations were assumed low enough to eliminate addressing 2nd Virial coefficient effects (concentration effects on molecular weight).

The Systematic Approach for the determination of each detector offset was implemented in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)), using data obtained from the three detectors while analyzing a broad linear polystyrene homopolymer and the narrow polystyrene standards, g'(HMW)/g'(LMW) Determination The g' was defined as the ratio of measured intrinsic viscosity [η] of polymer divided by the intrinsic viscosity [η]$_{linear}$ of a linear polymer having the same molecular weight. A value of g' is often used for indication of branching in a polymer. For the purpose of this invention, g' is defined as the same comonomer level for the inventive polymer and the linear polymer.

A value of g'(HMW)/g'(LMW) is a measure of the branching level difference between the highest and lowest molecular weight ranges. For linear polymers, the g'(HMW)/g'(LMW) value equals 1.0 and for branched polymer this value is less than 1.0.

The g'(HMW)/g'(LMW) value was calculated using 3D-GPC. A value of g'$_i$, the g' value at i$^{th}$ fraction in the polymer molecular weight distribution was calculated. The polymer molecular weight distribution curve was normalized and weight fraction at i$^{th}$ molecular weight was calculated.

The g'(HMW) was calculated by the weighted mean value of g' calculated for the 30% of polymer with highest molecular weight, $$g'(HMW) = \frac{\sum_i (g'_i \times w_i)}{\sum_i w_i} = \frac{\sum_i (g'_i \times w_i)}{0.30}$$

here $w_i$ is the i$^{th}$ fraction of polymers within the 30% of polymers with highest molecular weight, and g' is the [η]/[η]$_{linear}$ value in the same i$^{th}$ fraction.

The g'(LMW) was calculated in the same way, where $w_j$ is the j$^{th}$ fraction of polymers within the 30% of polymers with lowest molecular weight.

$$g'(LMW) = \frac{\sum_j (g'_j \times w_j)}{\sum_j w_j} = \frac{\sum_j (g'_j \times w_j)}{0.3}$$

Creep Zero Sheer Viscosity Method

Specimens for creep measurements were prepared on a programmable Tetrahedron bench top press. The program held the melt at 177° C. for 5 minutes at a pressure of 10$^7$ Pa. The chase was then removed to the benchtop to cool down to room temperature. Round test specimens were then die-cut from the plaque using a punch press and a handheld die with a diameter of 25 mm. The specimen is about 1.8 mm thick.

Zero-shear viscosities are obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 m above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the order of 10$^{-3}$ s$^{-1}$ for the samples in this study. Steady state is determined by taking a linear regression for all the data in the last 10% time window of the plot of log(J(t)) vs. log(t), where J(t) is creep compliance and t is creep time. If the slope of the linear regression is greater than 0.97, steady state is considered to be reached, then the creep test is stopped. In all cases in this study the slope meets the criterion within 30 minutes. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s at 10% strain. The complex viscosity values of the two tests are compared. If the difference of the viscosity values at 0.1 rad/s is greater than 5%, the sample is considered to have degraded during the creep test, and the result is discarded.

Zsvr Definition:

Zero-shear viscosity ratio (ZSVR) is defined as the ratio of the zero-shear viscosity (ZSV) of the inventive polymer to the ZSV of a linear polyethylene material at the equivalent weight average molecular weight (M$_{w\text{-}gpc}$) as shown in the equation below.

$$ZSVR = \frac{\eta_0}{\eta_{0L}}$$

The η$_0$ value (in Pa·s) is obtained from creep test at 190° C. via the method described above. It is known that ZSV of linear polyethylene η$_{0L}$ has a power law dependence on its M$_w$ when the M$_w$ is above the critical molecular weight M$_c$. An example of such a relationship is described in Karjala et al. (Annual Technical Conference—Society of Plastics Engineers (2008), 66$^{th}$, 887-891) as shown in the equation below and it is used in the present invention to calculate the ZSVR values. η$_{0L}$=2.29×10$^{-15}$ M$_{w\text{-}gpc}^{3.65}$ The M$_{w\text{-}gpc}$ value in the equation (in g/mol) is determined by using the GPC method as defined in the next section.

M$_{w\text{-}gpc}$ Determination

To obtain M$_{w\text{-}gpc}$ values, the chromatographic system consisted of either a Polymer Laboratories Model PL-210 or a Polymer Laboratories Model PL-220. The column and carousel compartments were operated at 140° C. Three Polymer Laboratories. 10-μm Mixed-B columns were used with a solvent of 1,2,4-trichlorobenzene. The samples were prepared at a concentration of 0.1 g of polymer in 50 mL of solvent. The solvent used to prepare the samples contained 200 ppm of the antioxidant butylated hydroxytoluene (BHT). Samples were prepared by agitating lightly for 4 hours at 160° C. The injection volume used was 100 microliters and the flow rate was 1.0 mL/min. Calibration of the GPC column set was performed with twenty one narrow molecular weight distribution polystyrene standards purchased from Polymer Laboratories. The polystyrene standard peak molecular weights were converted to polyethylene molecular weights using $$M_{polyethylene} = A(M_{polystyrene})^B \quad (3)$$

where M is the molecular weight, A has a value of 0.4316 and B is equal to 1.0. A third order polynomial was determined to build the logarithmic molecular weight calibration as a function of elution volume. Polyethylene equivalent molecular weight calculations were performed using Viscotek TriSEC software Version 3.0. The pecision of the weight-average molecular weight $\Delta M_{w,2s}$ was excellent at <2.6%.

Gel Rating of the Polymers.

Method/Description of GI200 Test

Extruder: Model OCS ME 20 available from OCS Optical Control Systems GmbH Wullener Feld 36, 58454 Witten, Germany or equivalent.

| Parameter | Standard Screw |
| --- | --- |
| L/D | 25/1 |
| Coating | Chrome |
| Compression ratio | 3/1 |
| Feed Zone | 10D |
| Transition Zone | 3D |
| Metering Zone | 12D |
| Mixing Zone | — |

Cast Film Die: ribbon die, 150×0.5 mm, available from OCS Optical Control Systems GmbH, or equivalent.

Air Knife: OCS air knife to pin the film on the chill roll, available from OCS Optical Control Systems GmbH, or equivalent.

Cast Film Chill Rolls and Winding Unit: OCS Model CR-8, available from OCS Optical Control Systems GmbH, or equivalent.

| | | Profile Number | | |
| --- | --- | --- | --- | --- |
| | | 070 | 071 | 072 |
| MELT INDEX | dg/min | 0.1-1.2 | 1.2-3.2 | 3.2-32 |
| Density | g/cm³ | ALL | ALL | ALL |
| Throat | ° C. | 25 ± 3 | 25 ± 3 | 25 ± 3 |
| Zone 1 | ° C. | 180 ± 5 | 160 ± 5 | 140 ± 5 |
| Zone 2 | ° C. | 240 ± 5 | 190 ± 5 | 170 ± 5 |
| Zone 3 | ° C. | 260 ± 5 | 200 ± 5 | 175 ± 5 |
| Zone 4 | ° C. | 260 ± 5 | 210 ± 5 | 175 ± 5 |
| Adapter | ° C. | 260 ± 5 | 225 ± 5 | 180 ± 5 |
| Die | ° C. | 260 ± 5 | 225 ± 5 | 180 ± 5 |
| Screw Type | | Standard | Standard | Standard |
| Screw Speed | RPM | 70 ± 2 | 70 ± 2 | 70 ± 2 |
| Air Knife Flow | Nm³/h | 6 ± 2 | 6 ± 2 | 6 ± 2 |
| Die to Chill Roll | mm | 6 ± 1 | 6 ± 1 | 6 ± 1 |
| Die to Air Knife | mm | 6 ± 1 | 6 ± 1 | 6 ± 1 |
| Chill Speed | m/min. | 3 ± 1 | 3 ± 1 | 3 ± 1 |
| Chill Temp. | ° C. | 20 ± 2 | 20 ± 2 | 20 ± 2 |
| Tension Speed | m/min. | 6 ± 2 | 6 ± 2 | 6 ± 2 |
| Winder Torque | N | 8 ± 1 | 8 ± 1 | 8 ± 1 |
| Lab Temperature | ° C. | 23 ± 2 | 23 ± 2 | 23 ± 2 |
| Lab Humidity | % | <70 | <70 | <70 |
| Width | mm | 108 ± 18 | 108 ± 18 | 108 ± 18 |
| Thickness | μm | 76 ± 5 | 76 ± 5 | 76 ± 5 |

Gel Counter: OCS FS-3 line gel counter consisting of a lighting unit, a CCD detector and an image processor with the Gel counter software version 3.65e 1991-1999, available from OCS Optical Control Systems GmbH, or equivalent. The OCS FS-5 gel counter is equivalent.

Instantaneous GI1200

Note: GI stands for "gel index". GI200 includes all gels ≥200 μm in diameter.

The instantaneous GI200 is the sum of the area of all the size classes in one analysis cycle:

$$X_j = \sum_{k=1}^{4} A_{T,j,k}$$

where:
$X_j$=instantaneous GI200 (mm²/24.6 cm³) for analysis cycle j
4=total number of size clauses
GI200

GI200 is defined as the trailing average of the last twenty instantaneous GI200 values:

$$\text{where: } <X> = \sum_{j=1}^{20} X_j/20$$

$$<X> = GI200(\text{mm}^2/24.6\text{ cm}^3)$$

One analysis cycle inspects 24.6 cm³ of film. The corresponding area is 0.324 m² for a film thickness of 76 μm and 0.647 m² for a film thickness of 38 μm.

Gel Content Measurement:

When the ethylene interpolymer, either alone or contained in a composition is at least partially crosslinked, the degree of crosslinking may be measured by dissolving the composition in a solvent for specified duration, and calculating the percent gel or unextractable component. The percent gel normally increases with increasing crosslinking levels.

Long Chain Branching Per 1000 Carbons:

The presence of long chain branching can be determined in ethylene homopolymers by using $^{13}C$ nuclear magnetic resonance (NMR) spectroscopy and is quantified using the method described by Randall (Rev. *Macromol. Chem. Phys.*, C29, V. 2&3, 285-297). There are other known techniques useful for determining the presence of long chain branches in ethylene polymers, including ethylene/1-octene interpolymers. Two such exemplary methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., *J. Chem. Phys.*, 17, 1301 (1949), and Rudin, A., Modern Methods of Polymer Characterization, John Wiley & Sons, New York (1991) 103-112.

Hot Tack Testing of Films:

Hot Tack testing can be determined in accordance to Strength (Hot Tack) of Thermoplastic Polymers and Blends Comprising the Sealing Surfaces of Flexible Webs as referenced in ASTM F-1921_04.

Ethylenic Polymers of this Invention:

The ethylenic polymers of this invention are relatively high molecular weight, relatively low density polymers that have a unique combination of (A) a relatively low total amount of unsaturation, and (B) a relatively high ratio of vinyl groups to total unsaturated groups in the polymer chain, as compared to known metallocene-catalyzed ethylenic polymers. This combination is believed to result in lower gels for end-use applications (such as films) where low gels are important, better long-term polymer stability and, for end-use applications requiring cross-linking, better control of that cross-linking, in each case while maintaining a good balance of other performance properties.

The novel polymers of this invention are interpolymers of ethylene with at least 0.1 mole percent of one or more comonomers, preferably at least one α-olefin comonomer. The α-olefin comonomer(s) may have, for example, from 3 to 20 carbon atoms. Preferably, the α-olefin comonomer may have 3 to 8 carbon atoms. Exemplary α-olefin comonomers include, but are not limited to, propylene, 1-butene, 3-methyl-1-butene, 1-pentene, 3-methyl-1-pentene, 4-methyl-1-pentene, 1-hexene, 1-heptene, 4,4-dimethyl-1-pentene, 3-ethyl-1-pentene, 1-octene, 1-nonene, 1-decene, 1-dodecene, 1-tetradecene, 1-hexadecene, 1-octadecene and 1-eicosene.

Preparation of an Ethylenic Polymer of this Invention

For producing the ethylenic polymers of this invention, a solution phase polymerization process may be used. Typically, such a process occurs in a well-stirred reactor such as a loop reactor or a sphere reactor at temperature from about 150 to about 300° C., preferably from about 160 to about 180° C., and at pressures from about 30 to about 1000 psi, preferably from about 30 to about 750 psi. The residence time in such a process is typically from about 2 to about 20 minutes, preferably from about 10 to about 20 minutes. Ethylene, solvent, catalyst, and one or more comonomers are fed continuously to the reactor. Exemplary solvents include, but are not limited to, isoparaffins. For example, such solvents are commercially available under the name ISOPAR E from ExxonMobil Chemical Co., Houston, Tex. The resultant mixture of ethylene-based polymer and solvent is then removed from the reactor and the polymer is isolated. Solvent is typically recovered via a solvent recovery unit, that is, heat exchangers and vapor liquid separator drum, and is recycled back into the polymerization system.

Suitable catalysts for use in preparing the novel polymers of this invention include any compound or combination of compounds that is adapted for preparing such polymers in the particular type of polymerization process, such as solution-polymerization, slurry-polymerization or gas-phase-polymerization processes.

In one embodiment, an ethylenic polymer of this invention is prepared in a solution-polymerization process using a polymerization catalyst that is a metal complex of a polyvalent aryloxyether corresponding to the formula:

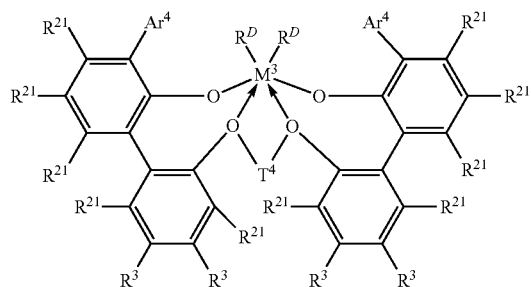

where $M^3$ is Ti, Hf or Zr, preferably Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

Such polyvalent aryloxyether metal complexes and their synthesis are described in WO 2007/136496 or WO 2007/136497, using the synthesis procedures disclosed in US-A-2004/0010103. Among the preferred polyvalent aryloxyether metal complexes are those disclosed as example 1 in WO 2007/136496 and as example A10 in WO 2007/136497. Suitable cocatalysts and polymerization conditions for use of the preferred polyvalent aryloxyether metal complexes are also disclosed in WO 2007/136496 or WO 2007/136497.

The metal complex polymerization catalyst may be activated to form an active catalyst composition by combination with one or more cocatalysts, preferably a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. So-called modified methyl aluminoxane (MMAO) or triethyl aluminum (TEA) is also suitable for use as a cocatalyst. One technique for preparing such modified aluminoxane is disclosed in U.S. Pat. No. 5,041,584 (Crapo et al.). Aluminoxanes can also be made as disclosed in U.S. Pat. No. 5,542,199 (Lai et al.); U.S. Pat. No. 4,544,762 (Kaminsky et al.); U.S. Pat. No. 5,015,749 (Schmidt et al.); and U.S. Pat. No. 5,041,585 (Deavenport et al.).

Polymeric Blends or Compounds of this Invention:

Various natural or synthetic polymers, and/or other components, may be blended or compounded with the novel polymers of this invention to form the polymeric compositions of this invention. Suitable polymers for blending with the embodiment ethylenic polymer include thermoplastic and non-thermoplastic polymers including natural and synthetic polymers. Suitable synthetic polymers include both ethylene-based polymers, such as high pressure, free-radical low density polyethylene (LDPE), and ethylene-based polymers prepared with Ziegler-Natta catalysts, including high density polyethylene (HDPE) and heterogeneous linear low density polyethylene (LLDPE), ultra low density polyethylene (ULDPE), and very low density polyethylene (VLDPE), as well as multiple-reactor ethylenic polymers ("in reactor" blends of Ziegler-Natta PE and metallocene PE, such as products disclosed in U.S. Pat. No. 6,545,088 (Kolthammer et al.); U.S. Pat. No. 6,538,070 (Cardwell et al.); U.S. Pat. No. 6,566,446 (Parikh et al.); U.S. Pat. No. 5,844,045 (Kolthammer et al.); U.S. Pat. No. 5,869,575 (Kolthammer et al.); and U.S. Pat. No. 6,448,341 (Kolthammer et al.)). Commercial examples of linear ethylene-based polymers include ATTANE™ Ultra Low Density Linear Polyethylene Copolymer, DOWLEX™ Polyethylene Resins, and FLEXOMER™ Very Low Density Polyethylene, all available from The Dow Chemical Company. Other suitable synthetic polymers include polypropylene, (both impact modifying polypropylene, isotactic polypropylene, atactic polypropylene, and random ethylene/propylene copolymers), ethylene/diene interpolymers, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous olefin-based polymers such as ethylene-based or propylene-based plastomers or elastomers can also be useful as components in blends or compounds made with the ethylenic polymers of this invention. Commercial examples of homogeneous metallocene-catalyzed, ethylene-based plastomers or elastomers include AFFINITY™ polyolefin plastomers and ENGAGE™ polyolefin elastomers, both available from The Dow Chemical Company, and commercial examples of homogeneous propylene-based plastomers and elastomers include VERSIFY™ performance polymers, available from The Dow Chemical Company, and VISTAMAX™ polymers available from ExxonMobil Chemical Company.

The polymeric compositions of this invention include compositions comprising, or made from, the ethylenic polymer of this invention in combination (such as blends or compounds, including reaction products) with one or more other components, which other components may include, but are not limited to, natural or synthetic materials, polymers, additives, reinforcing agents, ignition resistant additives, fillers, waxes, tackifiers, antioxidants, stabilizers, colorants, extenders, crosslinkers, blowing agents, and/or plasticizers. Such polymeric compositions may include thermoplastic polyolefins (TPO), thermoplastic elastomers (TPE), thermoplastic vulcanizates (TPV) and/or styrenic/ethylenic polymer blends. TPEs and TPVs may be prepared by blending or compounding one or more ethylenic polymers of this invention (including functionalized derivatives thereof) with an optional elastomer (including conventional block copolymers, especially an SBS or SEBS block copolymer, or EPDM, or a natural rubber) and optionally a crosslinking or vulcanizing agent. A TPO polymeric composition of this invention would be prepared by blending or compounding one or more of the ethylenic polymers of this invention with one or more polyolefins (such as polypropylene). A TPE polymeric composition of this invention would be prepared by blending or compounding one or more of the ethylenic polymers of this invention with one or more elastomers (such as a styrenic block copolymer or an olefin block copolymer, such as disclosed in U.S. Pat. No. 7,355,089 (Chang et al.)). A TPV polymeric composition of this invention would be prepared by blending or compounding one or more of the ethylenic polymers of this invention with one or more other polymers and a vulcanizing agent. The foregoing polymeric compositions may be used in forming a molded object, and optionally crosslinking the resulting molded article. A similar procedure using different components has been previously disclosed in U.S. Pat. No. 6,797,779 (Ajbani, et al.).

Processing Aids:

In certain aspects of the invention, processing aids, such as plasticizers, can also be included in the polymeric composition. These aids include, but are not limited to, the phthalates (such as dioctyl phthalate and diisobutyl phthalate), natural oils (such as lanolin, and paraffin, naphthenic and aromatic oils obtained from petroleum refining), and liquid resins from rosin or petroleum feedstocks. Exemplary classes of oils useful as processing aids include white mineral oil such as KAYDOL® oil (Chemtura Corp.; Middlebury, Conn.) and SHELLFLEX® 371 naphthenic oil (Shell Lubricants; Houston, Tex.). Another suitable oil is TUFFLO® oil (Lyondell Lubricants; Houston, Tex.).

Stabilizers and Other Additives:

In certain aspects of the invention, the ethylenic polymers are treated with one or more stabilizers, for example, antioxidants, such as IRGANOX® 1010 and IRGAFOS® 168 (Ciba Specialty Chemicals; Glattbrugg, Switzerland). In general, polymers are treated with one or more stabilizers before an extrusion or other melt processes. For example, the compounded polymeric composition may comprise from 200 to 600 wppm of one or more phenolic antioxidants, and/or from 800 to 1200 wppm of a phosphite-based antioxidant, and/or from 300 to 1250 wppm of calcium stearate. In other aspects of the invention, other polymeric additives are blended or compounded into the polymeric compositions, such as ultraviolet light absorbers, antistatic agents, pigments, dyes, nucleating agents, fillers, slip agents, fire retardants, plasticizers, processing aids, lubricants, stabilizers, smoke inhibitors, viscosity control agents, and/or anti-blocking agents. The polymeric composition may, for example, comprise less than 10 percent by the combined weight of one or more of such additives, based on the weight of the ethylenic polymer.

Other Additives:

Various other additives and adjuvants may be blended or compounded with the ethylenic polymers of this invention to form polymeric compositions, including fillers (such as organic or inorganic particles, including nano-size particles, such as clays, talc, titanium dioxide, zeolites, powdered metals), organic or inorganic fibers (including carbon fibers, silicon nitride fibers, steel wire or mesh, and nylon or polyester cording), tackifiers, waxes, and oil extenders (including paraffinic or naphthelenic oils), sometimes in combination with other natural and/or synthetic polymers.

Cross-Linking Agents:

For those end-use applications in which it is desired to fully or partially cross-link the ethylenic polymer of this invention, any of a variety of cross-linking agents may be used. Some suitable cross-linking agents are disclosed in Zweifel Hans et al., "Plastics Additives Handbook," Hanser Gardner Publications, Cincinnati, Ohio, 5th edition, Chapter 14, pages 725-812 (2001); Encyclopedia of Chemical Technology, Vol. 17, 2nd edition, Interscience Publishers (1968); and Daniel Seem, "Organic Peroxides," Vol. 1, Wiley-Interscience, (1970). Non-limiting examples of suitable cross-linking agents include peroxides, phenols, azides, aldehyde-amine reaction products, substituted ureas, substituted guanidines; substituted xanthates; substituted dithiocarbamates; sulfur-containing compounds, such as thiazoles, sulfenamides, thiuramidisulfides, paraquinonedioxiine, dibenzoparaquinonedioxime, sulfur; imidazoles; silanes and combinations thereof. Non-limiting examples of suitable organic peroxide cross-linking agents include alkyl peroxides, aryl peroxides, peroxyesters, peroxycarbonates, diacylperoxides, peroxyketals, cyclic peroxides and combinations thereof. In some embodiments, the organic peroxide is dicumyl peroxide, t-butylisopropylidene peroxybenzene, 1,1-di-t-butyl peroxy-3,3,5-trimethylcyclohexane, 2,5-dimethyl-2,5-di(t-butyl peroxy) hexane, t-butyl-cumyl peroxide, di-t-butyl peroxide, 2,5-dimethyl-2,5-di-(t-butyl peroxy) hexyne or a combination thereof. In one embodiment, the organic peroxide is dicumyl peroxide. Additional teachings regarding organic peroxide cross-linking agents are disclosed in C. P. Park, "*Polyolefin Foam*", Chapter 9 of *Handbook of Polymer Foams* and Technology, edited by D. Klempner and K. C. Frisch, Hanser Publishers, pp. 198-204, Munich (1991). Non-limiting examples of suitable azide cross-linking agents include azidoformates, such as tetramethylenebis(azidoformate); aromatic polyazides, such as 4,4'-diphenylmethane diazide; and sulfonazides, such as p,p'-oxybis(benzene sulfonyl azide). The disclosure of azide cross-linking agents can be found in U.S. Pat. Nos. 3,284, 421 and 3,297,674. In some embodiments, the cross-linking agents are silanes. Any silane that can effectively graft to and/or cross-link the ethylene/α-olefin interpolymer or the polymer blend disclosed herein can be used. Non-limiting examples of suitable silane cross-linking agents include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group such as a hydrocarbyloxy, hydrocarbonyloxy, and hydrocarbylamino group. Non-limiting examples of suitable hydrolyzable groups include methoxy, ethoxy, formyloxy, acetoxy, proprionyloxy, alkyl and arylamino groups. In other embodiments, the silanes are the unsaturated alkoxy silanes which can be grafted onto the interpolymer. Some of these silanes and their preparation methods are more fully described in U.S. Pat. No. 5,266,627. The amount of the cross-linking agent can vary widely, depending upon the nature of the ethylenic polymer or the polymeric composition to be cross-linked, the particular cross-linking agent employed, the processing conditions, the amount of grafting initiator, the ultimate application, and other factors. For example, when vinyltrimethoxysilane (VTMOS) is used, the amount of VTMOS is generally at least about 0.1 weight percent, at least about 0.5 weight percent, or at least about 1 weight percent, based on the combined weight of the cross-linking agent and the ethylenic polymer or the polymeric composition.

End Use Applications:

The ethylenic polymer of this invention may be employed in a variety of conventional thermoplastic fabrication processes to produce useful articles, including objects comprising at least one film layer, such as a monolayer film, or at least one layer in a multilayer film, which films may be prepared by cast, blown, calendered, or extrusion coating processes; molded articles, such as blow molded, injection molded, or rotomolded articles; extrusions; fibers; woven or non-woven fabrics; and composite or laminate structures made with any of the foregoing articles.

The ethylenic polymers of this invention (either alone or in blends or compounds with other components) may be used in producing fibers, such as staple fibers, tow, multi-component, sheath/core, twisted, and monofilament fibers. Suitable fiber-forming processes include spunbonded and melt blown techniques, as disclosed in U.S. Pat. No. 4,340, 563 (Appel et al.), U.S. Pat. No. 4,663,220 (Wisneski et al.), U.S. Pat. No. 4,668,566 (Nohr et al.), and U.S. Pat. No. 4,322,027 (Reba), gel spun fibers as disclosed in U.S. Pat. No. 4,413,110 (Kavesh et al.), woven and nonwoven fabrics, as disclosed in U.S. Pat. No. 3,485,706 (May), or structures made from or with such fibers, including blends with other fibers (such as polyester, nylon or cotton, and drawn, twisted, or crimped yarns or fibers) or in composition or laminated structures with fibrous or non-fibrous materials (such as nonwovens or films).

The ethylenic polymers of this invention (either alone or in blends or compounds with other components) may be used in a variety of films, including but not limited to clarity shrink films, collation shrink films, cast stretch films, silage films, stretch hooder films, sealants (including heat sealing films), stand-up-pouch films, liner films, and diaper backsheets.

The ethylenic polymers are especially useful for making films or film layers, preferably wherein the film or film layer is subsequently heat sealed to form a thermally welded bond. The ethylenic polymers preferably have a peak hot tack in (N/inch) is greater than or equal to the quantity (13−0.395*$I_2$) at a seal bar temperature of from 90 to 140° C.

The ethylenic polymers of this invention (either alone or in blends or compounds with other components) are also useful in other direct end-use applications, such as for wire and cable coatings, in sheet extrusion for vacuum forming operations, and forming molded articles, including articles made via any of the known thermoplastic molding technologies, including injection molding, blow molding, or rotomolding processes. The polymeric compositions of this invention can also be formed into fabricated articles using other conventional polyolefin processing techniques.

Other suitable applications for the ethylenic polymers of this invention (either alone or in blends or compounds with other components) include films and fibers; soft touch goods, such as tooth brush handles and appliance handles; gaskets and profiles; adhesives (including hot melt adhesives and pressure sensitive adhesives); footwear (including shoe soles and shoe liners); auto interior or exterior parts and profiles; foam goods (both open and closed cell); impact modifiers for other thermoplastic polymers such as high density polyethylene, isotactic polypropylene, or other olefin polymers; coated fabrics (such as artificial leather); hoses; tubing; weather stripping; cap liners; flooring (such as hard or soft flooring and artificial turf); and viscosity index modifiers, as well as pour point modifiers, for lubricants.

Further treatment of the ethylenic polymers or polymeric compositions of this invention may be performed to render them more suitable for other end uses. For example, dispersions (both aqueous and non-aqueous) can also be formed using ethylenic polymers or polymeric compositions of this invention, such as by a dispersion-manufacturing process. Frothed foams comprising the embodiment ethylenic polymer can also be formed, as disclosed in PCT Publication No. 2005/021622. The ethylenic polymers or polymeric compositions of this invention may also be crosslinked by any known means, such as the use of peroxide, electron beam, silane, azide, or other cross-linking technique. The ethylenic polymers or polymeric compositions of this invention can also be chemically modified, such as by grafting (for example by use of maleic anhydride (MAH), silanes, or other grafting agent), halogenation, amination, sulfonation, or other chemical modification.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

EXAMPLES

Resin Production

Comparative Example A and, Inventive Examples 1 and 2 were prepared based on the following process. All raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. The individual catalyst components are manually batch diluted to specified component concentrations with purified solvent (Isopar E) and pressured to above reaction pressure at 525 psig. All reaction feed flows are measured with mass flow meters and independently controlled with computer automated valve control systems.

The continuous solution polymerization reactor consists of a liquid full, non-adiabatic, isothermal, circulating, and independently controlled loop. The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. by passing the feed stream through a heat exchanger. The fresh comonomer feed to the polymerization reactor is fed in with the solvent feed. The total fresh feed to each polymerization reactor is injected into the reactor at two locations with roughly equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump.

The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives such as antioxidants, can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper. After validation of initial polymer properties the solid polymer pellets are manually dumped into a box for storage. Each box typically holds ~1200 pounds of polymer pellets.

The non-polymer portions removed in the devolatilization step pass through various pieces of equipment which separate most of the ethylene which is removed from the system to a vent destruction unit (it is recycled in manufacturing units). Most of the solvent is recycled back to the reactor after passing through purification beds. This solvent can still have unreacted co-monomer in it that is fortified with fresh co-monomer prior to re-entry to the reactor. This fortification of the co-monomer is an essential part of the product density control method. This recycle solvent can still have some hydrogen which is then fortified with fresh hydrogen to achieve the polymer molecular weight target. A very small amount of solvent leaves the system as a co-product due to solvent carrier in the catalyst streams and a small amount of solvent that is part of commercial grade co-monomers.

Unless otherwise stated, implicit from the context or conventional in the art, all parts and percentages are based on weight.

Comparative Sample E and Examples 6 and 7

Ethylenic polymers are prepared in order to compare the properties of ethylene-octene polymers (Comparative Example E) prepared using a known metallocene catalyst to the properties of ethylene-octene polymers (Examples 6 and 7) of this invention. Each ethylenic polymer is prepared in plant operating substantially in accordance with the resin production section above.

Comparative Example A and Inventive Examples 1 and 2

Three ethylenic polymers are prepared in order to compare the hot tack strength and sealing window properties of the ethylene-octene polymers (Comparative Example A) prepared using a known constrained geometry metallocene catalyst to the properties of two ethylene-octene polymers (Inventive Examples 6 and 7) of this invention when fabricated into a sealant layer in a multilayer film. Each ethylenic polymer is prepared substantially in accordance with the resin production section above based on the polymerization conditions reported in Table 1. Comparative Example A and Inventive Examples 1 and 2 were tested for their properties, and results are reported in Table 2.

TABLE 1

| Example | Catalyst | MI ($I_2$) | Density | Reactor Temp (° C.) | Solvent/ C2 Ratio | Corrected Exit C, (g/L) | Reactor Polymer Concentration (Wt %) | $H_2$ Mole % | Octene/ Olefin Ratio |
|---|---|---|---|---|---|---|---|---|---|
| Comparative Example A | 1301/RIBS2/MMAO | 0.98 | 0.901 | | | | | | |
| Inventive Example 1 | 6114/RIBS2/MMAO | 1.13 | 0.900 | 120.9 | 4.49 | 86.5 | 19.31 | 1.075 | 40.98 |

TABLE 1-continued

| Example | Catalyst | MI ($I_2$) | Density | Reactor Temp (° C.) | Solvent/ C2 Ratio | Corrected Exit C, (g/L) | Reactor Polymer Concentration (Wt %) | $H_2$ Mole % | Octene/ Olefin Ratio |
|---|---|---|---|---|---|---|---|---|---|
| Inventive Example 2 | 6114/RIBS2/MMAO | 0.98 | 0.897 | 138.7 | 4.51 | 85.9 | 19.2 | 0.459 | 40.98 |

MMAO is modified methyl aluminoxane;

RIBS-2 is bis(hydrogenated tallow alkyl_methyl, tetrakis(pentafluorophenyl)borate(1-)amine;

Zircomium based catalyst (6114) is [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium; and 1301 is a metallocene catalyst.

TABLE 2

| Example | Catalyst | Melt Flow Ratio $I_{10}/I_2$ | ELla-s $M_w$ | $M_n$ | $M_w/M_n$ | Zero Shear Viscosity (Pa-s) 190° C.) | ZSV Ratio | DSC Melting point (° C.) | g' (HMW)/g' (LMW) |
|---|---|---|---|---|---|---|---|---|---|
| Comparative Example A | 1301/RIBS2/MMAO | 9.1 | 89760 | 36740 | 2.44 | 13029 | 4.75 | 98.5 | 0.950 |
| Inventive Example 1 | 6114/RIBS2/MMAO | 6.3 | 99620 | 44540 | 2.24 | 7610 | 1.89 | 96.4 | |
| Inventive Example 2 | 6114/RIBS2/MMAO | 6.4 | 103100 | 47080 | 2.19 | 8776 | 1.93 | 98.9 | 0.967 |

Comparative Film A and Inventive Films 1 and 2. The polymers of Comparative Example A and Inventive Examples 1 and 2 are fabricated into sealant-layer A (AA, A1 and A2, respectively) of a three-layer film of the structure A/B/C, wherein A is a Sealant Layer, B is a Core Layer, and C is an Outer Layer. Layers B and C are the same for each case, with layer B comprising a 90/10 blend of ATTANE™ ULDPE (4201) polymer with AMPLIFY™ GR 205 functionalized polymer (both available from The Dow Chemical Company), and layer C comprising ULTRA-MID® C 33L 01 polyamide made by BASF Corporation is a Nylon 66/6 (Polyamide 66/6 Copolymer) plastic material. Comparative Film A and Inventive Films 1 and 2 are prepared according to the processing conditions reported in Table 3. Comparative Film A and Inventive Films 1 and 2 were tested for hot tack strength and sealing window properties, and the results are reported in Table 4 and FIG. 1. Preferably, the peak hot tack in (N/inch) is greater than or equal to the quantity $(13-0.395*I_2)$ at a seal bar temperature of from 90 to 140° C.

TABLE 3

| | | Inventive Film 1 Coextruded | | | Inventive Film 2 Coextruded | | | Inventive Film A Coextruded | | |
|---|---|---|---|---|---|---|---|---|---|---|
| Sample ID | | A1-Layer | B-Layer | C-Layer | A2-Layer | B-Layer | C-Layer | AA-Layer | B-Layer | C-Layer |
| Melt Temperature | ° C. | 184 | — | 225 | 185 | — | 225 | 185 | — | 226 |
| Screw Speed | Rpm | 66 | 72 | 49 | 66 | 72 | 49 | 66 | 72 | 49 |
| Motor Amps | A | 4.8 | 6.5 | 2.2 | 4.9 | 6.9 | 2.3 | 4.1 | 6.3 | 2.2 |
| Melt Back Pressure | bar | 283 | 346 | 101 | 306 | 374 | 103 | 247 | 339 | 99 |
| Feed Rate | kg/h | 2.8 | 6.8 | 3.1 | 2.7 | 6 | 3.1 | 3 | 6 | 3 |

TABLE 4

| Example | 60° C. | 70° C. | 80° C. | 90° C. | 100° C. | 110° C. | 120° C. | 130° C. | 140° C. | 150° C. |
|---|---|---|---|---|---|---|---|---|---|---|
| Comparative Film A | 0.242 | 0.356 | 2.34 | 5.49 | 10.12 | 8.71 | 8.97 | 7.78 | 8.79 | 12.42 |
| Inventive Film 1 | 0.264 | 0.604 | 1.59 | 4.67 | 15.86 | 16.71 | 11.90 | 12.70 | 11.75 | 5.81 |
| Inventive Film 2 | 0.258 | 0.276 | 1.08 | 3.51 | 13.03 | 15.52 | 12.92 | 12.12 | 11.70 | 9.00 |

We claim:

1. A composition comprising an ethylene/α-olefin copolymer that is an ethylene/octene copolymer comprising:
   an overall polymer density from 0.897 g/cc to 0.900 g/cc;
   a GI200 gel rating of not more than 15;
   an I10/I2 (measured at 190° C.) from 5.8 to 6.5;
   a zero shear viscosity (ZSV) ratio from 1.3 to 2.3;
   an Mw/Mn from 2.0 to 2.4;
   a g'(HMW)/g'(LMW) of greater than 0.95; and
   the ethylene/α-olefin copolymer has a DSC melting point defined by the relationship,
   Tm (° C.)≤(−7914.1*(density)$^2$)+(15301*density)−7262.4, where density is in g/cc; and
at least one other natural or synthetic polymer.

2. The composition of claim 1 wherein at least one of the other natural or synthetic polymer(s) is selected from the group consisting of at least one thermoplastic or elastomeric olefin polymer and at least one styrenic block copolymer.

3. The composition of claim 1 comprising
   at least one other component selected from the group consisting of a tackifier, a wax, and an oil.

4. A fabricated article wherein a portion of the fabricated article comprises the composition of claim 1.

5. The fabricated article of claim 4 wherein the fabricated article comprises a film, a sheet, a fiber, a nonwoven, a laminate, or a composite.

6. The fabricated article of claim 5 wherein the article is a multilayer film and the layer of the film that comprises the ethylene/α-olefin copolymer has a peak hot tack in (N/inch) that is greater than or equal to the quantity (13−0.395*I2) at a seal bar temperature of from 90 to 140° C.

7. A composition comprising an ethylene/α-olefin copolymer that is an ethylene/octene copolymer comprising:
   an overall polymer density from 0.897 g/cc to 0.900 g/cc;
   a GI1200 gel rating of not more than 15;
   an I10/I2 (measured at 190° C.) from 5.8 to 6.5;
   a zero shear viscosity (ZSV) ratio from 1.3 to 2.3;
   an Mw/Mn from 2.0 to 2.4;
   a g'(HMW)/g'(LMW) of greater than 0.95; and
   the ethylene/α-olefin copolymer has a DSC melting point defined by the relationship,
   Tm (° C.)≤(−7914.1*(density))+(15301*density)−7262.4, where density is in g/cc;
wherein at least a portion of the ethylene/α-olefin copolymer has been cross-linked.

8. A composition comprising an ethylene/α-olefin copolymer that is an ethylene/octene copolymer comprising:
   an overall polymer density from 0.897 g/cc to 0.900 g/cc;
   a GI200 gel rating of not more than 15;
   an I10/I2 (measured at 190° C.) from 5.8 to 6.5;
   a zero shear viscosity (ZSV) ratio from 1.3 to 2.3;
   an Mw/Mn from 2.0 to 2.4;
   a g'(HMW)/g'(LMW) of greater than 0.95; and
   the ethylene/α-olefin copolymer has a DSC melting point defined by the relationship,
   Tm (° C.)≤(−7914.1*(density)$^2$)+(15301*density)−7262.4, where density is in g/cc;
wherein at least a portion of the ethylenic polymer has been functionalized.

* * * * *